March 25, 1952 A. J. WINCHESTER, JR., ET AL 2,590,666
REEL CONTROL SYSTEM
Filed April 26, 1949
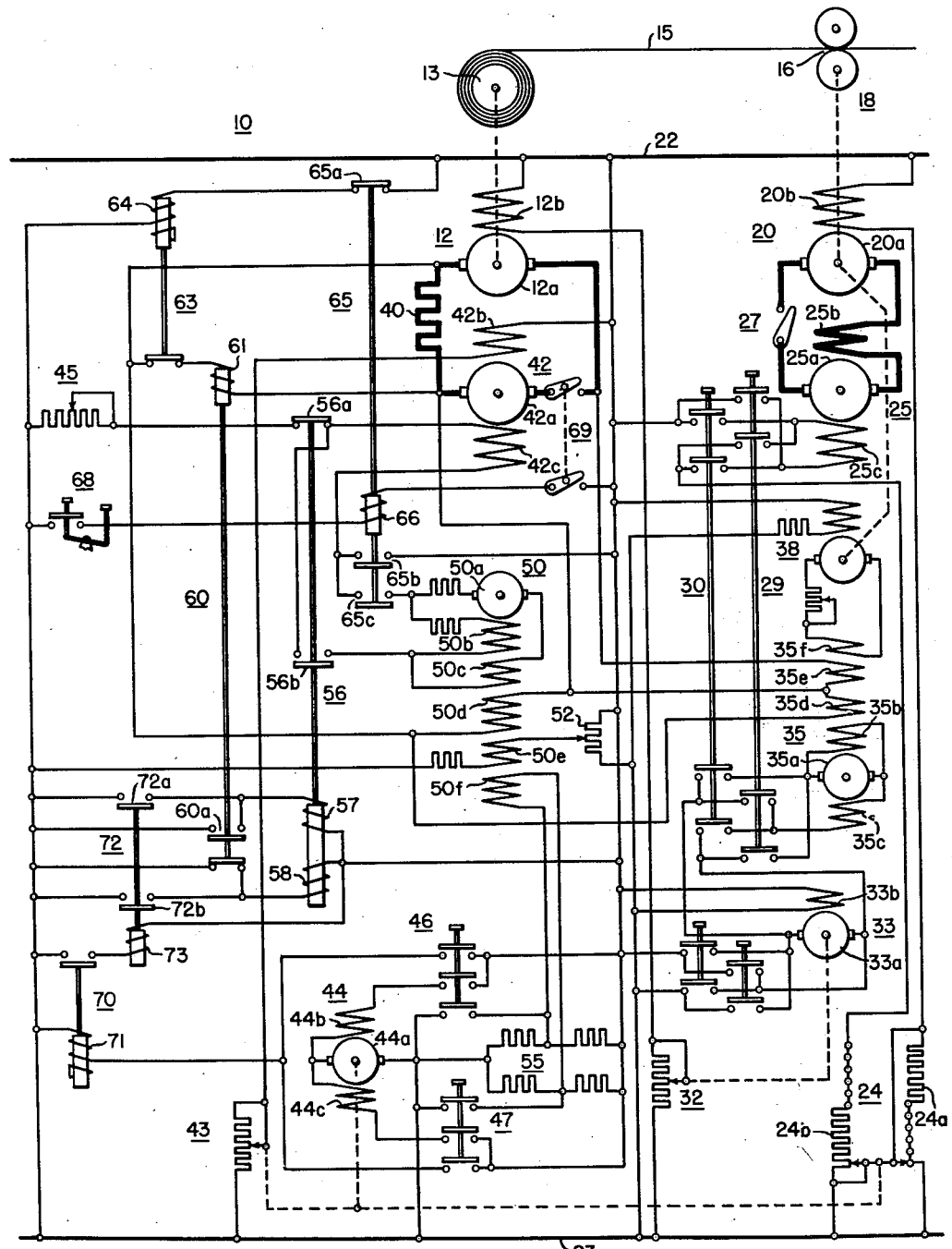
WITNESSES:
Robert C. Baird
F. V. Giolma
INVENTORS
Amos J. Winchester, Jr. &
William D. King.
BY G. M. Crawford
ATTORNEY Patented Mar. 25, 1952

2,590,666

UNITED STATES PATENT OFFICE 2,590,666

REEL CONTROL SYSTEM

Amos J. Winchester, Jr., Pittsburgh, Pa., and William D. King, Buffalo, N. Y., assignors to Westinghouse Electric Corporation, East Pittsburgh, Pa., a corporation of Pennsylvania Application April 26, 1949, Serial No. 89,684

9 Claims. (Cl. 242—75)

Our invention relates, generally, to reel control systems, and it has reference, in particular, to a control system for use with dynamo-electric machines used with reel devices for winding and/or unwinding a strip of material or the like.

More specifically, it is an object of our invention to provide a reel control system that is simple and inexpensive to manufacture, and is reliable and effective in operation.

More specifically, it is an object of our invention to provide, in a reel control system, for transferring effectively from a threading operation to a winding operation.

Another object of our invention is to provide, in a control system for a reel device, for normally regulating for a constant value of reel motor armature current, and yet regulate for a predetermined reel speed during a threading operation.

It is also an object of our invention to provide, in a reel control system, for initially operating a generator supplying electrical energy to a reel motor to maintain a predetermined reel speed, and for subsequently connecting a regulating generator to control the output of the aforesaid generator to maintain a predetermined value of reel motor armature current.

It is an important object of our invention to provide, in a reel motor control system, for transferring the connections of a regulating field winding of a generator supplying electrical energy to the motor in accordance with a load condition of the reel motor after the reel motor is started.

Yet another object of our invention is to provide for transferring the control of a generator supplying electrical energy to a reel motor in accordance with load conditions of the motor, and yet prevent a transfer from taking place when the load conditions occur during a period of acceleration or deceleration of the mill.

Other objects will, in part, be obvious and will, in part, be explained hereinafter.

In practicing our invention in one of its forms, a dynamo-electric machine connected in driving relation with a reel device operates in one direction as a reel motor and in the other direction as a drag or braking generator, as a strip of material is either wound onto the reel device or unwound therefrom. Electrical energy is supplied to the armature of the dynamo-electric machine from a generator whose output is controlled during a winding operation by a regulating generator which is responsive to the armature current of the dynamo-electric machine. The field excitation of the dynamo-electric machine is regulated by a regulating generator which is responsive to both the speed of the mill and of the dynamo-electric machine, and which controls a motor operated rheostat in the field circuit of the dynamo-electric machine so as to regulate for an E. M. F. proportional to mill speed. Initially, the output voltage of the control generator is determined by a threading speed rheostat which connects the field winding of the generator to a source of excitation. A load responsive transfer relay and a time delay relay cooperate to transfer the control of the generator from the threading speed rheostat to the regulating generator a predetermined time after the mill is started and when load is applied by the strip being threaded on the reel device.

For a more complete understanding of the nature and scope of our invention, reference may be made to the following detailed description, which may be read in connection with the accompanying drawing, in which the single figure is a diagrammatic view of a portion of a rolling mill illustrating one embodiment of the invention.

Referring to the drawing, the reference numeral 10 may denote, generally, a control system for a dynamo-electric machine 12 which may be connected in driving relation with a reel device 13 for functioning either as a reel motor or a drag generator in winding or unwinding a strip of material 15 which is being worked upon by the rolls 16 of a reversing mill designated generally by the numeral 18.

The rolls 16 of the mill 18 may be driven by a mill motor 20, comprising an armature 20a and a field winding 20b. The field winding 20b may be energized from a suitable source of excitation represented by the conductors 22 and 23, through one section 24a of a master rheostat 24, which controls the speed of the mill.

The armature 20a may be supplied with electrical energy from a main generator 25 comprising, an armature 25a, a series compounding or commutating field winding 25b and a main field winding 25c. The armature 25a may be connected in circuit relation with the armature 20a of the mill motor and the compounding field winding 25b through suitable switch means represented by the switch 27. The main field winding 25c may be connected between the conductors 22 and 23 through a pair of "forward" and "reverse" control switches 29 and 30 and a section 23b of the master rheostat 23.

The dynamo-electric machine 12 may comprise an armature 12a and a field winding 12b. The field winding 12b may be energized from the conductors 22 and 23 through a rheostat 32 provided with an operating motor 33 having an armature 33a and a field winding 33b. The field winding 33b may be connected to the conductors 22 and 23.

In order to provide for controlling the energization of the field winding 12b of the dynamo-electric machine 12 to maintain a value of counter E. M. F. which is proportional to the mill speed under the different speed conditions at which the dynamo-electric machine 12 operates, means such as the regulating generator 35 may be provided for supplying electrical energy to the armature 33a of the rheostat motor 33.

The regulating generator 35 may comprise, an armature 35a, a shunt type self-energizing field winding 35b, a series field winding 35c, an IR drop compensating field winding 35d, a voltage field winding 35e and a pattern field winding 35f.

The pattern field winding 35f may be energized from a pilot generator 38 connected in driving relation with the mill motor 20 for operating the rheostat motor in a direction such as to strengthen the field of the dynamo-electric machine 12.

The voltage field winding 35e and the IR drop compensating field winding 35d may be connected across the armature 12a and across a resistor 40 in the armature circuit for the dynamo-electric machine 12, respectively, in order to produce an indication of the counter E. M. F. or speed of the dynamo-electric machine 12.

Since the direction of the pattern field winding 35f will reverse when the mill is reversed, and the direction of the armature current remains the same while the terminal voltage of the dynamo-electric machine 12 reverses, the armature connections between the regulating generator 35 and the rheostat motor 33 may be reversed by the switches 29 and 30 so as to maintain the pattern field always in the direction to strengthen the field of the dynamo-electric machine 12.

Electrical energy may be supplied to the armature 12a of the dynamo-electric machine 12 when the machine is operating as a reel motor, from a generator 42 comprising, an armature 42a, a separately excited field winding 42b and a regulating field winding 42c. The armature 42a may be connected in series circuit relation with the armature 12a, and the field winding 42b may be energized from the conductors 22 and 23, through a field rheostat 43, which may be operatively connected with the master rheostat 24.

Operation of the master rheostat 24 may be effected by means of a rheostat motor 44 comprising, an armature 44a and field windings 44b and 44c disposed to be selectively connected to the conductors 22 and 23 through "raise" and "lower" push-button switches 46 and 47, respectively.

In order to provide for energizing the regulating field winding 42c, a regulating generator 50 may be utilized to regulate for a constant value of motor armature current. The regulating generator 50 comprises, an armature 50a, an antihunt field winding 50b, a series type field winding 50c, a current responsive field winding 50d, a pattern field winding 50e and an inertia compensating field winding 50f.

The pattern field winding 50e may be energized from the conductors 22 and 23, through a potentiometer device 52 adjustable to maintain different values of armature current in the dynamo-electric machine 12. The current field winding 50d may be connected differentially with respect to the pattern field winding 50e being, for example, connected across the resistor 40 in the armature circuit of the dynamo-electric machine 12. The inertia compensating field winding 50f may be energized from the conductors 22 and 23, through a bridge circuit of resistors 55 disposed to be unbalanced through operation of the "raise" and "lower" push-button switches 46 and 47 so as to be selectively differential or cumulative with respect to the pattern field winding 50e in order to maintain a more constant value of tension during change in speed of the mill.

In order to prevent the current regulating generator 42 from attempting to regulate for a predetermined value of armature current before the strip 15 is wound on the reel 13, control means such as the transfer relay 56, having operating windings 57 and 58, may be provided for normally connecting the regulating field winding 42c to the conductors 22 and 23 through a threading speed rheostat 45. The operating windings 57 and 58 may be so disposed that the relay operates upon energization of either one of the field windings, and cannot be moved from its operative position so long as either one of the windings remains energized.

With a view to transferring the connections of the regulating field winding 42c when the strip 15 is wrapped on the reel 13, a transfer control relay 60 may be provided having an operating winding 61 which may be energized in accordance with the armature current of the dynamo-electric machine 12. A time delay relay 63 having an operating winding 64, may be provided for interrupting the energizing circuit of the transfer control relay 60 for a predetermined time after the dynamo-electric machine 12 is initially energized, in order to prevent false operations. Operation of the time delay relay 63 may be initiated by means of a starting relay 65, having an operating winding 66 disposed to be energized through a push-button switch 68.

In order to prevent false operations of the transfer control relay 60 when the speed of the mill is changed, auxiliary control means comprising, a time delay relay 70 having an operating winding 71 and an auxiliary control relay 72 having an operating winding 73, may be provided. The time delay relay 70 may be disposed for operation in response to actuation of either the "raise" or the "lower" push-button switches 46 and 47, so as to effect operation of the auxiliary control relay 72 to provide a holding circuit for the transfer relay 56, and prevent it from dropping out even if the value of the armature current of the dynamo-electric machine 12 should be momentarily reduced by reason of operation of the inertia compensating field circuit of the regulating generator 50.

The mill 20 may be started by operating the "forward" push-button switch 29 and closing the switch 27, whereupon the mill will run at threading speed. Operation of the dynamo-electric machine 12 as a reel motor, for example, in order to wind up the strip of material 15 proceeding through the mill from right to left may be initiated by operating the push-button switch 68 and closing the control switch 69. The starting relay 65 will thereupon be energized to connect one end of the regulating field winding 42c to the conductor 22 and the regulating generator 50 through contact members 65b and 65c, respectively. The energizing circuit for the operating winding 64 of the time delay relay 63 is interrupted at contact member 65a.

Accordingly, the time delay relay 63, which is in the energized position, cannot return to the deenergized position for a predetermined time. During this time the upper end of the regulating field winding 42c is connected to the conductor 23 through contact member 56a of the transfer switch 56. Accordingly, the dynamo-electric machine 12 operates at a predetermined speed, as determined by the setting of the threading speed rheostat 45, which will customarily be on the order of 10 percent higher than the speed of the mill 19.

When the strip 15 is wrapped on the reel device 13 by means of a belt wrapper or the like, the armature current of the reel motor 12 increases. After the predetermined time delay of the relay 63, which is chosen to prevent operation of the transfer relay 56 in response to the starting surge of armature current of the reel motor, the current responsive control relay 69 will operate and provide an energizing circuit for the operating winding 57 of the transfer relay 56 through contact members 69a. The transfer relay operates, disconnecting the regulating field winding 42c from the conductor 23 at contact member 56a and connecting it to the regulating generator 50 through contact member 56b. The regulating generator 50 thereupon regulates the energization of the regulating field winding 42c to maintain a substantially constant value of armature current during normal operation.

As the strip 15 winds on the reel 13, the speed of the reel motor 12 gradually decreases. The counter E. M. F. of the reel motor decreases accordingly. The pattern field of the regulating generator 35 thereupon predominates, and the regulating generator produces a regulating voltage which is applied to the armature 33a of the rheostat motor 33 so as to operate the rheostat 32 in such a direction as to increase the excitation of the field winding 12b so as to restore the counter E. M. F. to its original value. This operation takes place progressively as the diameter of the coil on the reel device increases during a winding operation.

Should the speed of the mill 20 be increased by operating the "raise" push-button switch 46, the inertia compensating field winding 50f will be energized cumulatively with respect to the pattern field winding 50e so as to effect regulation for a higher value of armature current, and hence compensate for the inertia of the reel and other moving parts, and maintain a more nearly uniform value of tension in the strip. Should the speed of the mill be decreased by operating the "lower" push-button switch 47, the inertia compensating field winding 50f will be energized differentially with respect to the pattern field winding 50e, so that the regulating generator 50 regulates for a lower value of armature current.

Operation of the push-button switch 47 completes an energizing circuit for the time delay relay 70, which thereupon operates to provide an energizing circuit for the auxiliary control relay 72 for a predetermined interval of time. The control relay 72 completes holding circuits for the operating windings 57 and 58 of the transfer relay 56 through contact members 72a and 72b, respectively, so as to prevent transfer of the regulating field winding 42c, even if the value of armature current in the reel motor 12 should drop below the operating value for the current response relay 69.

The direction of the mill 19 may be reversed by operating the "reverse" push-button switch 39 to reverse the polarity of the field winding 25c of the main generator 25. This reverses the connections between the regulating generator 35 and the rheostat motor 33, so that the rheostat motor 33 now operates in response to the continuously increasing speed of the reel 13 as the strip 15 unwinds therefrom to actuate the rheostat 32 to progressively weaken the excitation of the field winding 12b of the dynamo-electric machine 12, which now operates as a drag generator. The regulating generator 50 continues to regulate for a substantially constant value of armature current since in this instance the strip 15 will be already attached to the reel device, so that the drag generator 12 will be initially under load, and transfer of the regulating field winding 42 from the excitation conductors 22 and 23 will not be necessary.

From the above description and accompanying drawing, it will be apparent that we have provided, in a simple and effective manner, for transferring from threading to a winding operation in a reel control system. By utilizing a load responsive transfer means, the transfer operation may be easily and effectively completed. The introduction of a time delay in the transfer operation prevents false operation of the transfer means in response to the initial surge of armature current during starting, and hence eliminates false operation of the transfer means. By utilizing control means responsive to acceleration of the mill, false operations of the transfer means as a result of reduction in the value of armature current during acceleration or deceleration may be prevented.

Since certain changes may be made in the above described construction, and different embodiments of the invention may be made without departing from the spirit and scope thereof, it is intended that all the matter contained in the above description and shown in the accompanying drawing shall be considered as illustrative and not in a limiting sense.

We claim as our invention:

1. A control system for a reel comprising, a dynamo-electric machine having an armature connected in driving relation with the reel, an additional dynamo-electric machine having an armature connected in electrical energy transferring relation with the armature of said dynamo-electric machine and having excitation means, a regulating generator connected to produce a regulating voltage in accordance with the armature current of the first mentioned dynamo-electric machine, circuit means connecting the excitation means for energization including relay means normally connecting the excitation means to a source of electrical energy, said relay means being operable in accordance with predetermined load conditions of the dynamo-electric machine to transfer the excitation means to the regulating generator, and time delay means operable to prevent transfer of said excitation means for a predetermined time after the excitation means is energized.

2. In a control system for a reel motor having an armature, a generator having excitation means and an armature connected to supply electrical energy to the armature of the reel motor, a regulating generator responsive to the load on the motor, relay means normally disposed to connect the generator excitation means to a source of electrical energy, said relay means being operable to connect the generator excitation means to the regulating generator in response to a predetermined load on the reel motor, starting means operable to initiate operation of the reel motor, and time delay means operable to prevent operation of the relay means for a predetermined time after operation of the starting means.

3. In combination with a reel device for winding a strip of material which is disposed to be secured thereon while the device is running, a motor having an armature connected in driving relation with the reel device, a generator connected to supply electrical energy to the reel motor armature and provided with field excitation means, a regulating generator disposed to energize the field excitation means to maintain a predetermined value of reel motor armature current, relay means normally connecting said field excitation means to a source of substantially constant excitation, said relay means being operable in response to a predetermined value of reel motor armature current to disconnect the field excitation means from said source and connect it to the regulating generator, and time delay means operable to render the relay means inoperative for a predetermined time after the reel motor is started.

4. In a drive for a reel device disposed to wind a strip of material, a motor connected in driving relation with the reel device, a generator connected in electrical energy transferring relation with the motor and provided with a plurality of field excitation means, a master rheostat operable to vary the energization of one of said excitation means, a regulating generator responsive to the armature current of the reel motor and disposed to energize another of the field excitation means to maintain a predetermined value of armature current, relay means normally disposed to connect said another of the field excitation means to a source of control potential, said relay means being connected for energization in accordance with the reel motor armature current and operable to transfer the connection of the said another field excitation means from said source to the regulating generator, time delay means operable to render the relay means ineffective for a predetermined time after the reel motor is started, and control means operable when the master rheostat is operated to prevent transfer of the field excitation means.

5. The combination in a drive for a reel device disposed to wind a strip of material, of a motor having an armature connected in driving relation with the reel device and provided with a field winding, regulating means connected to energize the field winding in accordance with a differential between the speed of the strip and the speed of the reel motor, a generator having an armature connected in circuit relation with the armature of the reel motor and having a field winding, an additional regulating generator disposed to effect energization of the generator field winding to maintain a predetermined value of reel motor armature current, relay means normally connecting the generator field winding to a source of substantially constant voltage, said relay means being connected for operation in accordance with a predetermined value of reel motor armature current, and time delay means operable to prevent operation of the relay means for a predetermined time.

6. In a control system for a reel device disposed adjacent a roll stand to reel a strip of material being worked on by the stand, a dynamo-electric machine connected in driving relation with the reel device having an armature and a field winding, regulating means disposed to effect energization of the field winding in accordance with a differential in the speeds of the strip and the dynamo-electric machine, an additional dynamo-electric machine having an armature connected in circuit relation with the armature of the first mentioned dynamo-electric machine and having a plurality of field windings, speed control means operable to vary the energization of one of said plurality of field windings, a regulating generator responsive to the armature current of the dynamo-electric machines disposed to produce a regulating voltage for maintaining a substantially constant value of armature current, relay means normally connecting another of the field windings of the additional dynamo-electric machine to a source of substantially constant voltage, said relay means being responsive to a predetermined value of armature current in the dynamo-electric machines to connect said another field winding to the regulating generator, and control means operable when the speed control means is operated to prevent a change in the connections of said another field winding.

7. The combination in a drive for a reel device disposed to wind or unwind a strip of material, of a dynamo-electric machine connected in driving relation with the reel device to act as a reel motor or a drag generator, said dynamo-electric machine having an armature and a field winding, an additional dynamoelectric machine having a plurality of field windings and an armature connected in circuit relation with the armature of the first-mentioned dynamo-electric machine, a master rheostat connected to effect variable energization of one of said windings to change the speed of the first mentioned dynamo-electric machine, a regulating generator disposed to produce an excitation voltage for another of said field windings of the additional dynamo-electric machine in accordance with the armature current thereof, transfer means disposed to connect said another field winding to a source of control voltage, said transfer means being operable in response to predetermined values of armature current to transfer the connection of said another field winding to the regulating generator, time delay means operable to prevent transfer of the connection of said winding for a predetermined time after the first-mentioned dynamo-electric machine is started, and control means operable to prevent operation of the transfer means when the master rheostat is operated.

8. A control system comprising a reel motor, a generator connected in electrical energy transferring relation with the reel motor and having a control field winding, regulating means responsive to the value of reel motor armature current, transfer means disposed to connect the control field winding to a source of substantially constant voltage, said transfer means being operable in response to a predetermined value of armature current to transfer the connections of the field winding to the regulating means, time delay means operable to prevent operation of the transfer means for a predetermined time after the reel motor is started, and additional time delay means operable when the control means operates to maintain the transfer means in whichever position it is for a predetermined time.

9. In a control system for a reel device disposed to accommodate a strip of material, a reel motor having a field winding and an armature disposed to be connected in driving relation with the reel device, rheostat means operable to effect variable energization of said field winding, generator means disposed to supply electrical energy to the armature of the reel motor and having a regulating field winding, a regulating generator responsive to the armature current of the reel motor disposed to effect energization of the regulating field winding to maintain a predetermined value of armature current, said regulating generator having an inertia compensating field winding connected to vary the predetermined value when the rheostat means is operated, transfer means normally disposed to connect the regulating field winding to a source of control voltage, said transfer means being operable in response to a predetermined value of reel motor armature current to transfer the connection of the regulating field winding to the regulating generator, a time delay relay operable to provide a holding circuit for the transfer means for a predetermined time after the rheostat means is operated, and additional time delay means operable to prevent operation of the transfer means for a predetermined time after the reel motor is started.

AMOS J. WINCHESTER, JR.
WILLIAM D. KING.

REFERENCES CITED

The following references are of record in the file of this patent:

UNITED STATES PATENTS

| Number | Name | Date |
|---|---|---|
| 1,908,199 | Umansky et al. | May 9, 1933 |
| 2,345,765 | Michel | Apr. 4, 1944 |
| 2,451,901 | Auburn | Oct. 19, 1948 |